US012406088B2

(12) United States Patent
Guillaudeux et al.

(10) Patent No.: US 12,406,088 B2
(45) Date of Patent: Sep. 2, 2025

(54) METHOD FOR EVALUATING THE RISK OF RE-IDENTIFICATION OF ANONYMISED DATA

(71) Applicant: BIG DATA SANTE, Nantes (FR)

(72) Inventors: Morgan Guillaudeux, Nantes (FR); Olivier Breillacq, Nantes (FR)

(73) Assignee: BIG DATA SANTE, Nantes (FR)

( * ) Notice: Subject to any disclaimer, the term of this patent is extended or adjusted under 35 U.S.C. 154(b) by 265 days.

(21) Appl. No.: 18/030,545

(22) PCT Filed: Oct. 7, 2021

(86) PCT No.: PCT/FR2021/000114
§ 371 (c)(1),
(2) Date: Apr. 6, 2023

(87) PCT Pub. No.: WO2022/074302
PCT Pub. Date: Apr. 14, 2022

(65) Prior Publication Data
US 2024/0005035 A1    Jan. 4, 2024

(30) Foreign Application Priority Data
Oct. 7, 2020  (FR) ....................... 2010259

(51) Int. Cl.
*G06F 21/62* (2013.01)
*G06F 21/54* (2013.01)
*G06F 21/57* (2013.01)

(52) U.S. Cl.
CPC .......... *G06F 21/6245* (2013.01); *G06F 21/54* (2013.01); *G06F 21/575* (2013.01); *G06F 21/6254* (2013.01)

(58) Field of Classification Search
None
See application file for complete search history.

(56) References Cited

U.S. PATENT DOCUMENTS

2019/0026490 A1 *    1/2019   Ahmed ............... G06F 21/6254

FOREIGN PATENT DOCUMENTS

EP    3567508 A1    11/2019
FR    3048101 A1    8/2017

OTHER PUBLICATIONS

Calvino Aida et al.: "Factor Analysis for Anonymization", 2017 IEEE International Conference on Data Mining Workshops (ICDMW), IEEE, Nov. 18, 2017, pp. 984-991.
(Continued)

*Primary Examiner* — Syed A Roni
(74) *Attorney, Agent, or Firm* — LEASON ELLIS LLP

(57) ABSTRACT

The method delivers a degree of protection (txP3) representative of the risk of re-identification of data in the case of a correspondence search attack including a deterministic search based on an external information source and a correspondence search based on a distance. The method comprises steps of E) consolidating a set of original individuals (EDO) and a set of anonymous individuals (IA); F) identifying, in the set of original individuals, individuals at risk (IOrs) via the deterministic correspondence search; G) evaluating a degree of failure of re-identification (txP1) for the sets of original individuals and of anonymous individuals, on the basis of the correspondence search based on distance; H) computing the degree of protection as a function of a total number of individuals in the original dataset, of a number (RS) of individuals at risk identified in step B) and of the degree of failure of re-identification (txP1).

8 Claims, 3 Drawing Sheets

(56) References Cited

OTHER PUBLICATIONS

Josep Domingo-Ferrer et al.: "Disclosire risk assessment in statistical microdata protection via advanced record linkage", Statistics and Computing, Kluwer Academic Publishers, BO, vol. 13, No. 4, Oct. 1, 2003, pp. 344-346.
Pagliuca Daniela et al.: "Some Results of individual Ranking Method on the System of Enterprise Accounts Annual Survey", In: "Statistical Disclosure Control", Jul. 30, 1998, pp. 11-12, 15-16.
Robinson-Cox J.F., « A record-linkage approach to imputation of missing data : Analyzing tag retention in a tag-recapture experiment », Journal of Agricultural, Biological, and Environmental Statistics 3(1), 1998, pp. 48-61.
Winkler W.E., « Matching and record linkage », Cox B.G. (Ed.), Business Survey Methods, Wiley, New York, 1995, pp. 355-384.
Fellegi I.P. et al., Jaro M.A., et Winkler W.E., « A theory of record linkage », Journal of the American Statistical Association 64, 1969, pp. 1183-1210.
Jaro M. A., « Advances in record-linkage methodology as applied to matching the 1985 Census of Tampa, Florida », Journal of the American Statistical Association 84, 1989, pp. 414-420.
Domingo-Ferrer J. et al., « Disclosure risk assessment via record linkage by a maximum-knowledge attacker », 13th Annual Conference on Privacy, Security and Trust (PST), 2015.
Kounine A. et al., « Assessing Disclosure Risk in Anonymized Datasets », FloCon 2008 Conference.
International Search Report for corresponding International Application No. PCT/FR2021/000114, dated Feb. 23, 2022.

\* cited by examiner

METHOD FOR EVALUATING THE RISK OF RE-IDENTIFICATION OF ANONYMISED DATA

CROSS-REFERENCE TO RELATED PATENT APPLICATIONS

This application is a U.S. National Stage Application under 35 U.S.C. § 371 of International Patent Application No. PCT/FR2021/000114 filed Oct. 7, 2021, which claims the benefit of priority of French Patent Application No. 2010259 filed Oct. 7, 2020, both of which are incorporated by reference in their entireties. The International Application was published on Apr. 14, 2022, as International Publication No. WO/2022/074302 A1.

TECHNICAL FIELD

The invention generally relates to the anonymization of sensitive data intended to be shared with third parties, for example, for the purposes of searching, analyzing or using said data. More particularly, the invention relates to a method for evaluating the risk of re-identification of anonymized data.

BACKGROUND

Generally, the data are a source of performance for organizations and constitute a significant asset for them. Data provides critical and valuable information for producing quality goods and services, as well as for decision making. They provide a competitive advantage that allows organizations to endure and to stand out from the competition. Data sharing, for example, in the form of "open data", is currently perceived as offering many opportunities, especially for expanding human knowledge and know-how, for innovation and for the creation of new products and services.

Data has become easy to share using digital technologies and technological innovations, beyond the organizations that gather and store said data with a view to using said data. The digital transformation of society, with the growth of social networks, the generalization of on-line shopping, the virtualization of services, etc., generates a data massification phenomenon called "big data". This data massification phenomenon is accentuated with a large number of countries adopting "open data" public policies that promote the opening and sharing of data. The technologies that are currently available allow storage, processing and analysis of this ever-increasing mass of data and allow knowledge and usable information to be extracted therefrom.

Data can to contain data of a personal nature, called "personal data", which are the subject of regulations relating to privacy. Thus, generally, the use, storage and sharing of personal data in France are subject to the European "General Data Protection Regulation (GDPR)" and to the French law known as "Loi informatique et libertés. Certain data, such as those relating to health, privacy and family, property and other things, are particularly sensitive and must be the subject of particular precautions.

Several anonymization methods are known and used to process original data so as to protect the privacy of individuals. Data anonymization may be defined as a process that eliminates the association between the identifying dataset and the subject of the data. The anonymization process aims to prevent singling out an individual in a dataset, linking between two records within the same dataset, or between two distinct datasets, when one of the records corresponds to data specific to an individual, and deducing information in the dataset. Thus, following an anonymization process, the data are presented in a form that must not allow the individuals to be identified, even when combined with other data.

The "k-anonymization" anonymization method is one of the most commonly used methods. This method seeks to make each record of a dataset indiscernible from at least k−1 other records of this dataset. The "L-diversity" anonymization method is an extension of the "k-anonymization" method that grants better protection of the data by involving, in each group of k records, called "k-group", the presence of at least L sensitive attribute values.

In general, the main known anonymization algorithms modify the data by deleting, generalizing or replacing personal information in the individual records. An alteration of the information content of the data may be the result of excessive anonymization. However, it is important for the anonymized data to remain quality data that retain a maximum amount of information content. It is on this condition that anonymized data remain useful for extracting knowledge by analyzing and reconciling with other data.

The choice of the anonymization algorithm and the adjustment of the operating parameters thereof are important for reconciling both the requirement to respect privacy and the need to preserve the usefulness of the data. In the prior art, a unique anonymization algorithm is not known that adapts to all the contexts and that yields the best result each time. Several anonymization algorithms exist with variable degrees of reliability and applicability contexts. The applicability context of the anonymization algorithms is characterized, among other things, by the type of data to be anonymized and by the desired use of the anonymized data.

The degree of reliability of the anonymization algorithm is directly related to the risk of re-identification of the anonymized data. This risk encompasses the risk of individualization, that is, the possibility of isolating an individual, the risk of correlation, that is, the possibility of linking distinct datasets concerning one and the same individual, and the risk of inference, that is, the possibility of deducing information concerning an individual. However, faced with the evolution of information technologies that allow linking data from various sources, it is almost impossible to guarantee anonymization that would offer zero risk of re-identification.

Various methods for evaluating the risk of re-identification of a dataset that has undergone anonymization processing, also called "metrics" hereafter, have been proposed and provide quantitative evaluations of this risk.

Some of these metrics use a "record-linkage" method, which is described by Robinson-Cox J. F. in the article entitled, "A record-linkage approach to imputation of missing data: Analyzing tag retention in a tag-recapture experiment", Journal of Agricultural, Biological, and Environmental Statistics 3(1), 1998, pp. 48-61. This method, which consists in comparing the individuals of a dataset that has undergone anonymization processing with an original starting dataset, was initially developed to improve the quality of the data by linking records relating to the same person in separate files. It also allows the reliability of an anonymization process to be evaluated when confronted with a re-identification attempt in which the attacker would be in possession of the anonymized dataset and of the original dataset of one or more individuals whose membership in the anonymized cohort they are seeking to prove.

Deterministic coupling methods, covered by Gill L. in the article entitled, "Methods for Automatic Record Matching and Linking and Their Use in National Statistics", National Statistics Methodology Series, no. 25, 2001, London: Office for National Statistics, assume the existence of a set of common variables in the files to be linked. The major problem of such an assumption is that a procedure for exactly matching the values adopted by the variables common to the individuals is not always possible, or sufficient, for establishing a link between the records. This problem is covered by Winkler W. E. in the article entitled, "Matching and record linkage", Cox B. G. (Ed.), Business Survey Methods, Wiley, New York, 1995, pp. 355-384. In reality, many small or significant differences exist between the variables common to two matched records, which differences originate from several factors that prevent a perfect correspondence of the values of these variables.

In order to overcome the aforementioned problem, non-deterministic methods have been developed that allow a link to be established between two records, with a match that can be probabilistic or based on a distance between the individuals.

Probabilistic matching allows linking probabilities to be established between records. Two records are considered to be linked when the linking probability between them exceeds a certain threshold. Probabilistic matching is described by Fellegi I. P. et al., Jaro M. A., and Winkler W. E. in their respective articles entitled, "A theory of record linkage", Journal of the American Statistical Association 64, 1969, pp. 1183-1210, "Advances in record-linkage methodology as applied to matching the 1985 Census of Tampa, Florida", Journal of the American Statistical Association 84, 1989, pp. 414-420, and "Advanced methods for record linkage", Proceedings of the American Statistical Association Section on Survey Research Methods, 1995, pp. 467-472.

Matching based on distance is described by Pagliuca D., et al. in the publication entitled, "Some Results of Individual Ranking Method on the System of Enterprise Accounts Annual Survey, Esprit SDC Project", Deliverable MI-3/D2, 1999. In this approach, distances are established between the individuals and each individual is associated with the nearest record or the second nearest record, and is called "linked to nearest" or "linked to 2nd nearest", respectively.

The article entitled, "Disclosure risk assessment via record linkage by a maximum-knowledge attacker", submitted by Josep Domingo-Ferrer, 13th Annual Conference on Privacy, Security and Trust (PST), 2015, relates to the assessment of the risk of disclosure via the linking of folders by an attacker possessing maximum knowledge. Comparisons of distributions of linking distances of an original dataset and of an anonymized dataset are described. The advantage of a minimum distance for obtaining an acceptable degree of protection is highlighted.

The risk of disclosure in anonymized datasets when an attacker benefits from external information or general knowledge is generally covered in the article entitled, "Assessing Disclosure Risk in Anonymized Datasets", Alexei Kounine et al., FloCon 2008 Conference.

SUMMARY

The aim of the present invention is to provide a new method for evaluating the risk of re-identification of anonymized data during a correspondence search attack including a deterministic search based on external information sources and a search based on distance.

According to a first aspect, the invention relates to a computer-implemented data processing method for evaluating a risk of re-identification of anonymized data, said method delivering a degree of protection representative of the risk of re-identification in the case of a correspondence search attack including a deterministic search based on at least one external information source and a correspondence search based on a distance, the method comprising the steps of E) consolidating an original dataset comprising a plurality of original individuals and an anonymized dataset comprising a plurality of anonymous individuals, the anonymous individuals being produced by a process of anonymizing original individuals; F) identifying, in said original dataset, original individuals at risk as being original individuals having at least one noteworthy, or unique, value in at least one considered variable, or at least one combination of noteworthy, or unique, values in a set of considered variables, in a deterministic correspondence search and to which only one respective close anonymous individual can be associated by the deterministic correspondence search; G) evaluating a degree of failure of re-identification for the original datasets and anonymized datasets, from the correspondence search based on a distance between each original individual and one or more of the nearest anonymous individuals identified by a method called "k-NN" method; H) computing the degree of protection as a function of a total number of original individuals in the original dataset, of a number of original individuals at risk identified in step B) and of the degree of failure of re-identification obtained in step G).

According to a particular feature of the method, in step F), an anonymous individual is considered to be a close anonymous individual of a considered individual at risk when 1) the anonymous individual has a variable with the same modality as a considered variable of the original individual at risk in the correspondence search in the case whereby the variable is a qualitative variable, or when 2) the anonymous individual has a value for the considered variable that is equal to a tolerance range close to the value of the same considered variable of the original individual at risk in the case whereby the considered variable in the deterministic correspondence search is a continuous variable.

According to another particular feature of the method, step G) comprises the sub-steps of: a) linking the original dataset to the anonymized dataset; b) converting the original individuals and the anonymous individuals in a Euclidean space, with the original individuals and anonymous individuals being represented by coordinates in the Euclidean space; c) identifying, for each of said original individuals, one or more of the nearest anonymous individuals based on said distance, using the "k-NN" method; and d) computing the degree of failure of re-identification as being a percentage of cases where a nearest anonymous individual identified in sub-step c) for a considered original individual is not a valid anonymous individual corresponding to this original individual.

According to yet another particular feature of the method, the aforementioned distance is a Euclidean distance.

According to another particular feature of the method, the transformation of sub-step b) is carried out by a factor method and/or using an artificial neural network, called "autoencoder".

According to yet another particular feature of the method, the factor method used for the transformation of sub-step b) is a "Principal Component Analysis" method when the individuals comprise continuous type variables, a "Multiple Correspondence Analysis" method when the individuals comprise qualitative type variables, or a "Factor Analysis of Mixed Data" method when the individuals comprise "continuous/qualitative" type variables.

The invention also relates to a data anonymization computer system including a data storage device storing program instructions for implementing the method as briefly described above.

The invention also relates to a computer program product including a medium in which program instructions are recorded that are readable by a processor for implementing the method as briefly described above.

BRIEF DESCRIPTION OF DRAWING

Further advantages and features of the present invention will become more clearly apparent upon reading the following description of several particular embodiments, with reference to the accompanying drawings, in which.

DETAILED DESCRIPTION

In the following description, for the purposes of explanation and not of limitation, specific details are provided in order to understand the described technology. It will be obvious to a person skilled in the art that other embodiments can be implemented in addition to the specific details described hereafter. In other cases, the detailed descriptions of well-known methods, techniques, etc. are omitted to avoid complicating the description with unnecessary details.

The evaluation of the risk of re-identification requires comparing an original dataset formed of individuals, called original individuals, with an anonymized dataset formed of individuals, called anonymous individuals. The individuals are typically data records. Each anonymous individual of the anonymized dataset represents an anonymized version of a corresponding original individual. A pair consisting of a original individual and a corresponding anonymous individual is designated "original/anonymous pair". The risk of re-identification is the risk that an attacker succeeds in linking a original individual with its anonymized record, in other words, the corresponding anonymous individual, thus forming a valid original/anonymous pair.

The method according to the invention for evaluating the risk of re-identification of data provides a metric, based on a centric individual approach, which allows the risk of re-identification of an item of personal data to be quantified during a correspondence search attack including a deterministic search based on external information sources and a search based on distance.

Figure 1:
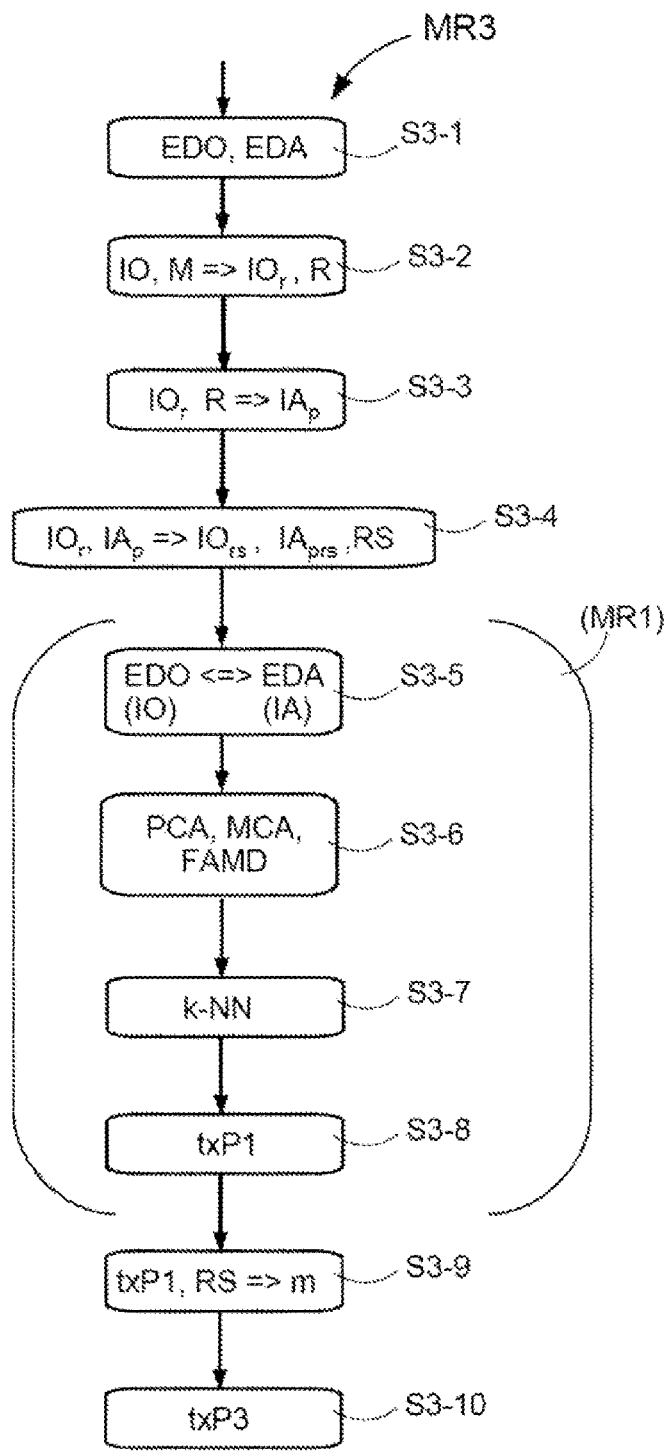
FIG. 1 is a flowchart showing large steps comprised in a particular embodiment of the method according to the invention.
Figure 2:
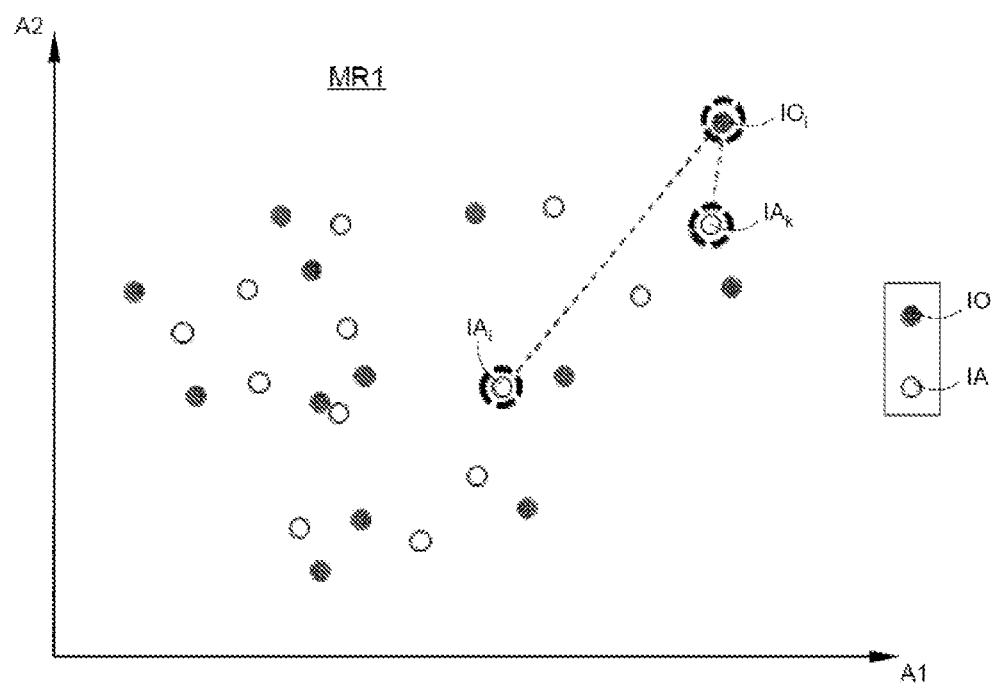
FIG. 2 shows an illustrative diagram of a method used in the particular embodiment of the method of the invention of FIG. 1 for evaluating a degree of failure of re-identification of an attacker during a correspondence search based on distance.

Referring to FIGS. 1 and 2, a particular embodiment, designated MR3, of the method of the invention will now be described, which is advantageously applicable within the context of an attack bordering between a deterministic correspondence search based on one or more external information sources and a correspondence search based on distance.

As shown in FIG. 1, this embodiment MR3 basically comprises ten steps, S3-1 to S3-10.

The first step S3-1 carries out data linkage processing and consolidates an original dataset EDO comprising a plurality of original individuals IO with an anonymized dataset EDA comprising a plurality of anonymized individuals IA. The anonymized data EDA are those data provided by an anonymization process that has processed the original data EDO and corresponding thereto.

The second step S3-2 is a step of identifying original individuals at risk, hereafter designated $IO_r$, in the considered set EDO that comprises M original individuals IO. In this step S3-2, the original individuals IO that are sought after are those having at least one noteworthy, or unique, value in at least one considered variable or at least one combination of noteworthy, or unique, values in a set of considered values, in the deterministic correspondence search. These original individuals IO having a value or a combination of noteworthy, or unique, values are those identified as being the original individuals $IO_r$ exposed to a risk of re-identification. In this case, R original individuals at risk $IO_r$ are considered to be identified from among the M considered original individuals IO.

The third step S3-3 is a step of identifying anonymous individuals near to the original individuals at risk $IO_r$ identified in step S3-2, hereafter designated $IA_p$. In this step S3-3, close anonymous individuals $IA_p$ are sought for each of the R original individuals at risk $IO_r$.

When the variables taken into account in the deterministic correspondence search are qualitative variables, the anonymous individuals IA that are retained as being close anonymous individuals $IA_p$ are those having the same modalities as the considered original individual at risk $IO_r$.

When the variables taken into account in the deterministic correspondence search are continuous variables, the anonymous individuals IA that are retained as being close anonymous individuals $IA_p$ are those for which the variables have values equivalent to those of the variables of the original individuals, that is, equal to a close tolerance range. Thus, the tolerance range can be predefined to more or less (+/−) 2.5%, for example, of the variance of the considered variable.

The fourth step S3-4 is a step of identifying, as a function of the results of step S3-3, the individuals that are potentially most exposed from among the original individuals at risk $IO_r$ identified in step S3-2. In this step S3-4, only the original individuals $IO_r$ having a unique close anonymous individual $IA_p$ are retained as being potentially the most exposed to risks of re-identification. These retained original individuals $IO_r$ are designated $IO_{rs}$ hereafter. In this case, RS original individuals at risk $IO_{rs}$ are considered to have been identified. The RS unique close anonymous individuals corresponding to the RS original individuals $IO_{rs}$ are designated $IA_{prs}$.

The fifth to eighth subsequent steps S3-5 to S3-8 implement a method, designated MR1, that allows evaluation, for the sets EDO and EDA, of a degree of failure of re-identification txP1 of an attacker during a correspondence search attack based on distance.

In step S3-5, the original dataset EDO comprising the original individuals IO is linked to the anonymized dataset EDA comprising the anonymized individuals IA.

Step S3-6 processes the transformation of the IO and IA individuals in a Euclidean space. According to the invention, various transformation methods can be used. Typically, but not exclusively, a factor method or an artificial neural network, called "autoencoder", can be used to convert the IO and IA individuals in the form of coordinates in a Euclidean space.

Various factor methods may be used as a function of the type of the data. Thus, the "Principal Component Analysis" (PCA) will typically be used when the variables are continuous. The "Multiple Correspondence Analysis" (MCA) will typically be used if the variables are qualitative. The "Factor Analysis of Mixed Data" (FAMD) will typically be used if the variables are mixed, that is, of the continuous type and of the qualitative type.

In the embodiment described herein, a factor method is used in step S3-6. In this step S3-6, significant axes of variance are identified in the datasets by a multivariate data analysis. These significant axes of variance determine the axes of the Euclidean space on which the individuals IO and IA are projected.

The transformation of the IO and IA individuals in the Euclidean space allows mathematical distance computations to be carried out between the individuals, based on their coordinates. The method of the invention provides for a preferred use of a Euclidean distance as a mathematical distance. However, it should be noted that the use of various other mathematical distances, such as a Manhattan distance, a Mahalanobis distance and other distances, is included in the vision of the present invention.

In step S3-7, the "k-Nearest Neighbors" method, called "k-NN", is used to identify the nearest anonymous individuals IA of the original individuals IO, with a mathematical distance such as a Euclidean distance.

In step S3-8, based on the distance measurement results obtained during the preceding step S3-7, the degree of failure of re-identification txP1 of an attacker using a correspondence search based on distance is computed. In this step S3-8, the degree of failure of re-identification txP1 is represented by the percentage of cases where an original individual IO and the corresponding nearest anonymous individual IA, identified in step S3-7, do not form a valid original/anonymous pair.

The processing carried out in the fifth to eighth steps, S3-5 to S3-8, described above is illustrated in FIG. 2. In the example of FIG. 2, described above, the original individuals IO and the anonymous individuals IA are respectively represented by black circles and white circles, in a Euclidean space having coordinate axes A1 and A2.

In this case, the considered example is that of an attacker in possession of a dataset containing anonymous data (individuals IA) of 100 people including a considered person i. The attacker is also in possession of the original data (individual $IO_i$) of the considered person i. The attacker attempts to prove that the original data (individual $IO_i$) of the considered person i forms part of the anonymized cohort.

In order to re-identify the valid original/anonymous pair ($IO_i$, $IA_i$), the attacker has to establish a correspondence of the individuals and to this end uses a mathematical distance between them, such as a Euclidean distance. The attacker identifies the anonymous individual $IA_k$ as being the anonymous individual nearest to the original individual $IO_i$, as schematically shown in FIG. 2, and associates the anonymous individual $IA_k$ with the original individual $IO_i$. FIG. 2 shows the case of a failure of the attacker, who failed to identify the valid original/anonymous pair ($IO_i$, $IA_i$) based on the distance. Thus, for example, if the attacker fails for 95 people out of the 100 considered people, the degree of failure of re-identification txP1 is equal to 95%.

With further reference to FIG. 1, the ninth step S3-9 is a step of evaluating the number m of successful re-identifications by the attacker on the original individuals $IO_{rs}$, based on the degree of failure of re-identification txP1 obtained in step S3-8 and on the number RS of original individuals $IO_{rs}$. For these successful identifications, the valid identified anonymous individuals IA are the unique close anonymous individuals $IA_{prs}$ (step S3-4) of the original individuals $IO_{rs}$. The number m is provided by the following equation: m=((100−txP1)/100)*RS, with the degree txP1 being a percentage (%).

The tenth step S3-10 computes a degree of protection, designated hereafter as txP3, for the considered original dataset EDO. The degree of protection txP3 is provided herein by the equality: txP3=(1−m/M)*100, with m being the number of successful re-identifications by the attacker that is determined in step S3-9 and M being the total number of original individuals IO in the set EDO. The degree of protection txP3 therefore corresponds to the percentage of individuals IO that has not been re-identified by the attacker in the original dataset EDO.

By way of example, an anonymized dataset is considered comprising M=100 individuals and an attacker wishing to re-identify people using external sources such as an electoral roll register. The attacker has, for example, access to three variables of the anonymized dataset, for example, the gender, the age and the home postal code.

According to the method of the invention, in its embodiment MR3 described above, original individuals at risk having a value or a combination of noteworthy, or unique, values for these three variables are initially sought after in the set of original individuals. Thus, for example, R=15 individuals at risk are identified from among the M=100 individuals.

For these R=15 individuals at risk, those having a unique close anonymous individual are searched for (the same value for the category variables and +/−2.5% of the variance for the continuous variables, as indicated above). RS=4 individuals, for example, are identified as meeting the aforementioned condition.

The degree of failure of re-identification of the attacker during a correspondence search attack based on distance is evaluated at txP1=50%. As a result, among the RS=4 original individuals having a unique close anonymous individual, m=((100−txP1)/100)*RS=2 original individuals are potentially re-identifiable. The degree of protection txP3 in this example is therefore provided by: txP3=(1−m/M)*100= (1−2/100)*100=98%.

Figure 3:
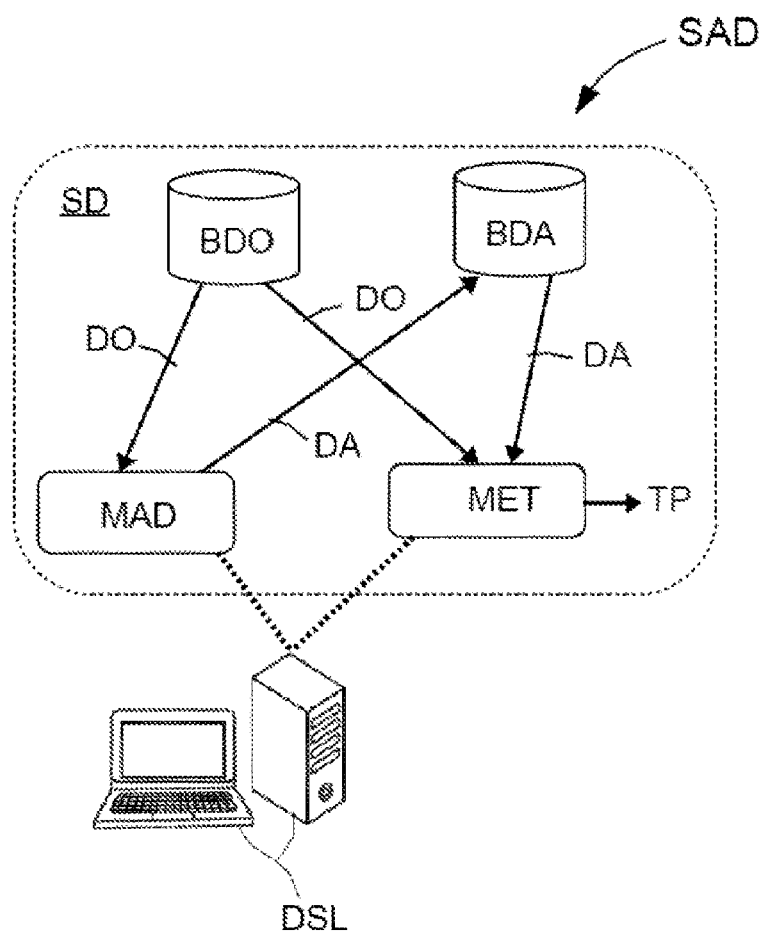
FIG. 3 shows an example of a general architecture of a data anonymization computer system in which the method according to the invention is implemented.

A general architecture of a data anonymization computer system SAD, in which the method for evaluating the risk of re-identification according to the invention is implemented, is shown by way of example in FIG. 3.

The system SAD in this case is installed in a local computer system DSL and comprises two software modules MAD and MET. The software modules MAD and MET are hosted in data storage devices SD, such as a memory and/or hard disk, of the local computer system DSL. The local computer system DSL also hosts an original database BDO, in which original data DO are stored, and an anonymized database BDA, in which the anonymized data DA are stored.

The software module MAD implements a data anonymization process that processes the original data DO and outputs the anonymized data DA.

The software module MET implements the method according to the invention for evaluating the risk of re-identification of data. The software module MET receives the original data DO and the anonymized data DA as input and outputs a degree of protection TP against the risk of re-identification. The implementation of the method according to the invention is ensured by a processor (not shown) of the local computer system DSL running code instructions from the software module MET. The degree of protection TP provided by the software module MET provides a measurement of the performance of the data anonymization process implemented by the software module MAD.

Of course, the invention is not limited to the embodiments that have been described herein by way of illustration. A person skilled in the art, according to the applications of the invention, can provide various modifications and variants that fall within the scope of protection of the invention.

The invention claimed is:

1. A computer-implemented data processing method for evaluating a risk of re-identification of anonymized data, said method delivering a protection rate parameter (txP3) representative of said risk of re-identification in case of a correspondence search attack including a deterministic search based on at least one external information source and a correspondence search based on a distance, said method comprising the steps of E) consolidating an original dataset (EDO) comprising a plurality of original individuals (IO) and an anonymized dataset (EDA) comprising a plurality of anonymous individuals (IA), said anonymous individuals (IA) being produced by a process of anonymizing said original individuals (IO); F) identifying, in said original dataset (EDO), original individuals at risk ($IO_{rs}$) as being original individuals (IO) having at least one noteworthy, or unique, value in at least one considered variable, or at least one combination of noteworthy, or unique, values in a set of considered variables, in a deterministic correspondence search and to which only one respective close anonymous individual ($IA_{prs}$) can be associated by said deterministic correspondence search; G) evaluating a re-identification failure rate parameter (txP1) for said original datasets (EDO) and anonymized datasets (EDA), from said correspondence search based on a distance between each of said original individuals (IO) and one or more of the nearest of said anonymous individuals (IA) identified by a method called "k-NN" method; H) computing said protection rate parameter (txP3) as a function of a total number (M) of original individuals (IO) in said original dataset (EDO), of a number (RS) of original individuals at risk ($IO_{rs}$) identified in step F) and of said re-identification failure rate parameter (txP1) obtained in step G).

2. The method according to claim 1, characterized in that, in step F), an anonymous individual (IA) is considered to be one of said nearest anonymous individuals ($IA_p$, $IA_{prs}$) of one of said considered individuals at risk ($IO_{rs}$) when 1) said anonymous individual (IA) has a variable with the same modality as a considered variable of said original individual at risk ($IO_{rs}$) in said correspondence search in the case wherein said variable is a qualitative variable, or when 2) said anonymous individual has a value for said considered variable that is equal to a tolerance range close to the value of said same considered variable of said original individual at risk ($IO_{rs}$) in the case wherein said considered variable in said deterministic correspondence search is a continuous variable.

3. The method according to claim 1, characterized in that step G) comprises the sub-steps of a) linking said original dataset (EDO) to said anonymized dataset (EDA); b) converting (PCA, MCA, FAMD) said original individuals (IO) and said anonymous individuals (IA) in a Euclidean space (A1, A2), with said original individuals (IO) and anonymous individuals (IA) being represented by coordinates in said Euclidean space (A1, A2); c) identifying, for each of said original individuals (IO), one or more of said nearest anonymous individuals (IA) based on said distance, using the "k-NN" method; and d) computing said re-identification failure rate parameter (txP1) as being a percentage of cases where one of said nearest anonymous individuals ($IA_k$) identified in sub-step c) for one of said original individuals ($IO_i$) is not a valid anonymous individual ($IA_i$) corresponding to said original individual ($IO_i$).

4. The method according to claim 3, characterized in that said distance is a Euclidean distance.

5. The method according to claim 3, characterized in that the transformation of sub-step b) is carried out by a factor method (PCA, MCA, FAMD) and/or using an artificial neural network, called "autoencoder".

6. The method according to claim 5, characterized in that said factor method is a "Principal Component Analysis" (PCA) method when said individuals (IO, IA) comprise continuous type variables, a "Multiple Correspondence Analysis" (MCA) method when said individuals (IO, IA) comprise qualitative type variables, or a "Factor Analysis of Mixed Data" (FAMD) method when said individuals (IO, IA) comprise "continuous/qualitative" type variables.

7. A data anonymization computer system (SAD) including a data storage device (SD) storing program instructions (MET) for implementing the method according to claim 1.

8. A computer program product including a medium in which program instructions (MET) are recorded that are readable by a processor for implementing the method according to claim 1.

* * * * *